A. HIGLEY.
Corn Sheller.
No. 37,912. Patented March 17, 1863.
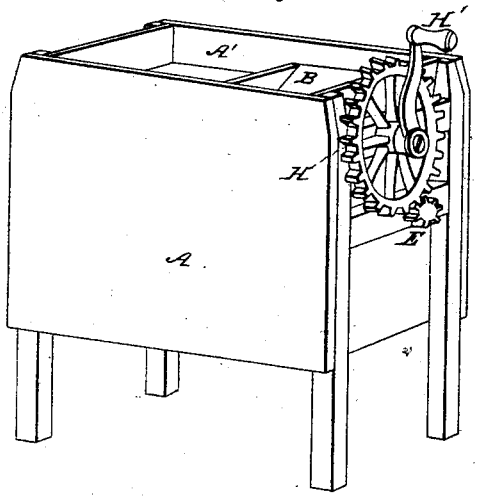
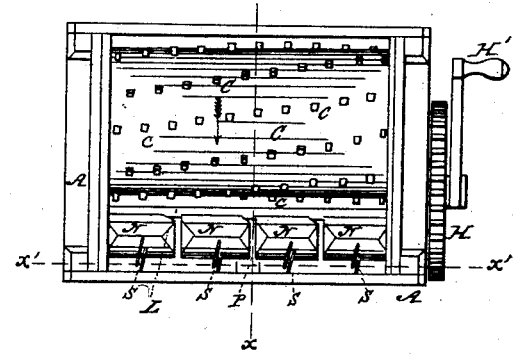
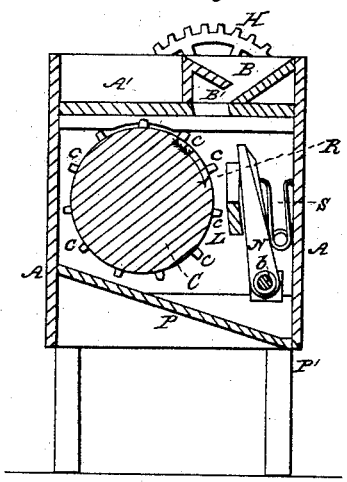
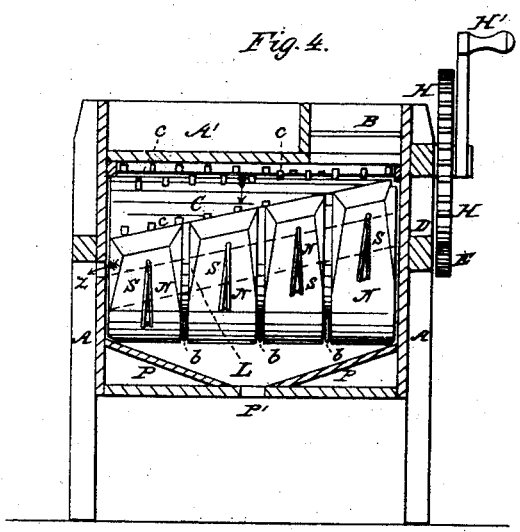
Witnesses:
Inventor:
Aaron Higley

UNITED STATES PATENT OFFICE.

AARON HIGLEY, OF WARREN, OHIO.

IMPROVEMENT IN CORN-SHELLERS.

Specification forming part of Letters Patent No. 37,912, dated March 17, 1863.

*To all whom it may concern:*

Be it known that I, AARON HIGLEY, of Warren, in the county of Trumbull and State of Ohio, have invented certain new and useful Improvements in Corn-Shellers; and I do hereby declare that the following is a full and complete description of the construction and operation of the same, reference being had to the accompanying drawings, making a part of this specification, in which—

Figure 1 is a perspective view. Fig. 2 is a top view with the cover entirely removed. Fig. 3 is a transverse section in the direction of the line $x$ $x$ in Fig. 2. Fig. 4 is a longitudinal section in the direction of the line $x'$ $x'$ in Fig. 2.

Similar letters of reference indicate corresponding parts in the several views.

My improvement relates to a machine for shelling corn operated by a crank, the ears of corn being put in a hopper, where they fall through, and are guided along the side of a revolving cylinder with teeth or spurs on its surface that removes the corn from the cob. The corn and cob are separated and discharged from the machine through different openings.

A represents the frame of the machine; B, the hopper at one end, (seen in Figs. 1, 3, and 4,) which can be made by having part of the cover so arranged that it can be let down in that form.

C is a cylinder, with teeth or spurs $c$ arranged diagonally upon its surface, supported at the ends with suitable journals or boxes connected with the frame. At one end of the cylinder is attached the pinion E, that is operated by means of the driving-gear H, which revolves upon a wrist secured to the frame.

L is a strip or slide-rest secured to the ends of the frame in a diagonal position, as indicated by the dotted lines in Fig. 4. Between this slide-rest and the side of the frame are adjustable arms N, the lower ends of which turn on the shaft $b$, Figs. 3 and 4, forming a joint. To the back of each of these arms and the side of the frame is attached a spring, $s$, that causes the arms to press against the ears of corn and keep them in contact with the cylinder.

The manner in which the different parts of this machine operate is as follows: While a person is turning the crank H' with one hand the ears of corn can be fed into the hopper with the other, (requiring but one person to operate it,) and it makes no difference in what position the ears are thrown in, as the inclination of the sides of the hopper will cause them to pass down through the opening B' onto the slide-rest L. By the revolution of the cylinder the spurs come in contact with the ear, removing the corn, and as the slide-rest is inclined downward, as indicated, the ear of corn slides down, being turned round and round until the corn is all shelled off, and the cob passes out at the opening $z$, as indicated by the arrow, and the corn falls down on the inclined planes P in the lower part of the machine and passes out at the opening P'. The adjustable arms N, with the springs, adapt the space R to any sized ear, and keep it in direct contact with the cylinder as it moves down on the slide-rest, even when part of the corn is shelled off the cob.

The corn to be shelled may be placed in the box or receptacle A', Figs. 1 and 4, formed by the sides extending above the cover, as represented. This cover also prevents the grains of corn from being thrown out and scattered.

This machine is very simple in construction, and less expensive than those in ordinary use, and shells corn with ease and rapidity.

What I claim as my improvement, and desire to secure by Letters Patent, is—

The special arrangement of the hopper B, slide-rest L, arms N, springs S, in combination with the toothed cylinder C, when operating conjointly, as and for the purpose set forth.

AARON HIGLEY.

Witnesses:
JOHN L. FRAZIER,
JEFFERSON PALM.